April 12, 1927.
E. T. BENNINGTON
SUSPENDED CARRIER
Filed Aug. 4, 1926
1,624,205
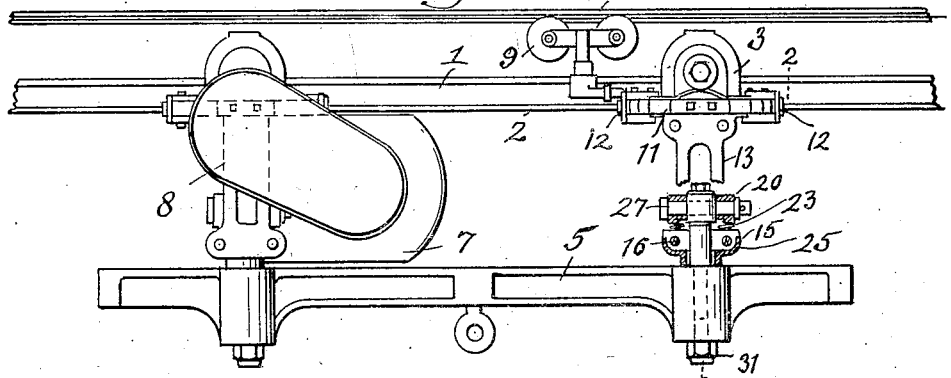
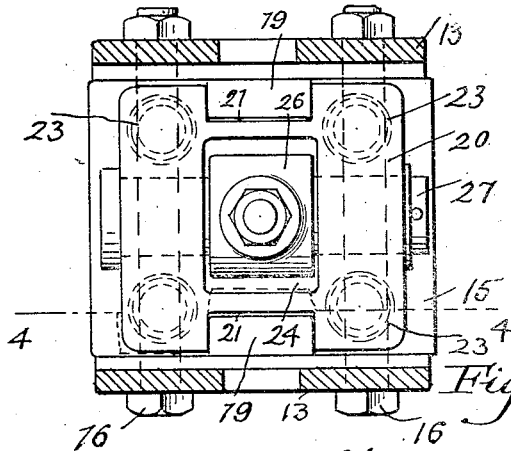
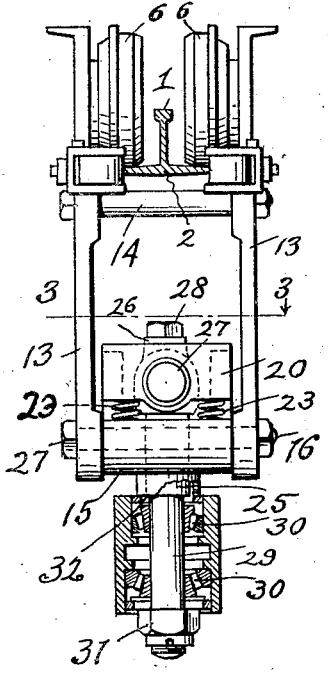
Inventor:
Earl T. Bennington
Kwis Hudson & Kent
Attys.

Patented Apr. 12, 1927.

1,624,205

UNITED STATES PATENT OFFICE.

EARL T. BENNINGTON, OF CLEVELAND HEIGHTS, OHIO, ASSIGNOR TO THE CLEVELAND CRANE AND ENGINEERING COMPANY, OF WICKLIFFE, OHIO, A CORPORATION OF OHIO.

SUSPENDED CARRIER.

Application filed August 4, 1926. Serial No. 127,079.

This invention relates to suspended carriers of the type in which the load supporting portion of the carrier is suspended from trucks which have wheels running upon an overhead track, the present invention being an improvement upon the carrier disclosed in my prior Patent No. 1,558,779, granted October 27, 1925.

The present invention has for an object to provide flexible and resilient connections between the load bar of the carrier and the trucks from which the load bar is suspended, so that jars and shocks due to unevenness in the trackway are absorbed by the springs, and the strains upon the suspension devices are to a large extent relieved.

A further object is to provide a carrier in which the load bar is so suspended from the trucks that it may have a limited lateral swinging movement, and in which cushioning means are provided which yieldably resist such swinging movements of the load bar.

With the above and other objects in view, the invention may be said to comprise the device as illustrated in the accompanying drawing, hereinafter described and particularly set forth in the appended claims, together with such variations and modifications thereof as will be apparent to one skilled in the art to which the invention appertains.

Reference should be had to the accompanying drawing forming a part of this specification, in which Fig. 1 is a side elevation of a carrier embodying the invention; Fig. 2 is a section on the broken line 2—2 of Fig. 1; Fig. 3 is a section on the line 3—3 of Fig. 2; and Fig. 4 is a section on the line 4—4 of Fig. 3.

Referring to the accompanying drawing, the carrier shown is designed to run upon a monorail track 1, formed of rails which are T-shaped in cross-section, and have oppositely extending flanges 2, upon which the carrier wheels run. The carrier is provided at the front and rear ends thereof with trucks 3 and 4 from which a load bar 5 is suspended. Each of the trucks is provided with a pair of flanged supporting wheels 6, which travel upon the opposed flanges of the track rails. The truck 4 has mounted thereon a suitable motor 7 which drives the supporting wheels of the truck through suitable gearing in a gear casing 8. The truck 3 has attached thereto a current collector 9 which engages with a conductor rail 10 extending alongside the track 1. Each of the trucks has leaf springs 11 attached to opposite sides thereof, which carry at their opposite ends in front of and to the rear of the truck, rollers 12 which bear against the edges of the opposite track rail flanges 2.

Each of the trucks is provided with depending side members 13, which are rigidly connected immediately beneath the rail by means of spacers 14, and which are rigidly connected at their lower ends by a bottom member 15, which fits between the two side members and is held in place by means of a pair of transverse bolts 16 extending therethrough and through the side members 13. The bottom member 15 has a central vertical opening 17, extending therethrough and surrounded on the under side of said member with a downwardly projecting boss 18. On the opposite sides thereof the bottom member 15 is provided with vertical guide flanges projecting upwardly therefrom, and mounted between these flanges and above the bottom member 15 there is a vertically movable block 20 which is provided on opposite sides thereof with grooves 21 which receive the guide flanges 19. The block 20 is substantially square, and is provided on the under side thereof with four spring receiving sockets 22, one adjacent each corner, in which are mounted compression coil springs 23, which rest upon the upper face of the bottom member 15 and serve to normally support the block 20 above the bottom member 15. The block 20 is provided with a central aperture 24, adapted to register with the opening 17 of the bottom member to receive a king-bolt 25, which has a head 26 within the aperture 24 of the block, the head 26 being provided with a transverse aperture and connected to the block 20 by the pivot pin 27 which extends through the block 20 and through the head 26 in a direction parallel with the trackway 1, and longitudinally of the carrier. The king-pin may be locked to the pivot pin 27 by means of a set screw 28, whereby it is held substantially at the center of the aperture 24. The aperture 17 in the bottom member is somewhat larger than the bolt 25, so that it will permit a slight lateral swinging movement of the bolt about its pivotal axis. The springs 23 being located adjacent the four corners of the block 20, there are a pair of springs upon each side of the pivot pin 27 which serve to yieldingly resist lateral swinging movement of the bolt in either direction.

Below the bottom member 15 each of the king-bolts 25 has a reduced lower end portion 29, and the load bar 5 is swiveled at its opposite ends upon the reduced lower end portions of the king-bolts by means of thrust roller bearings 30, the load bar being supported upon the bolts by means of nuts 31 screwed upon the lower ends of the bolts and clamping the load bar against shoulders 32 at the upper end of the reduced portion 29 of the bolt.

When the carrier has no load thereon, the springs 23 hold the load bar tightly against the lower end of the downwardly projecting boss 18 of the bottom member 15, so that when the carrier is running light, the load bar is held tightly against the truck, and the clatter, which would result from the lateral swinging movements of the empty load bar, is eliminated. When a load is attached to the load bar 5, a greater pressure is exerted on the springs 23, and the load bar is pulled downwardly away from the lower end of the boss 18, so that the load is yieldably supported, and jars or impacts due to irregularities in the track are to a large extent taken up by the supporting springs. In passing around curves of the trackway the momentum of the load has a tendency to swing the load bar laterally, and, since the load bar is pulled down away from the bosses 18, a slight lateral movement is permitted, but this lateral movement is resisted by the springs on the side of the carrier toward which the load is swinging. This cushioning of the lateral movement of the load bar prevents excessive bending stresses being put upon the king-bolts, such as would be imposed by sharp impacts against the fixed block if the bolt were freely suspended.

Having described my invention, I claim:

1. A carrier comprising spaced supporting trucks having wheels adapted to run on an overhead trackway, a member resiliently supported on each truck, a king-bolt suspended from each of said members, and a load bar swiveled to said bolts.

2. A carrier comprising spaced supporting trucks having wheels adapted to run on an overhead trackway, a load bar pivotally suspended from the trucks for lateral swinging movements with respect thereto, and means interposed between the trucks and load bar for yieldably resisting the lateral swinging movements of the load bar.

3. A carrier comprising spaced supporting trucks each having wheels adapted to travel on the opposite flanges of a monorail track, each truck having a pair of opposed depending side members and a bottom member connecting said side members below the track, a block supported for vertical movement between the side members of each truck, springs interposed between the blocks and the bottom members, and a load bar suspended from said blocks.

4. A carrier comprising spaced supporting trucks having wheels adapted to run on an overhead trackway, a member resiliently supported on each truck, a king-bolt pivotally suspended from each of said members, and a load bar swiveled to said bolts.

5. A carrier comprising spaced supporting trucks having wheels adapted to run on an overhead trackway, a member resiliently supported on each truck, a king-bolt pivotally connected at its upper end to said member to swing about an axis which extends longitudinally of the carrier, and a load bar swiveled to the lower end of the bolt.

6. A carrier comprising spaced supporting trucks having wheels adapted to run on an overhead trackway, each truck having a pair of opposed depending side members and a bottom member connecting said side members, a block mounted upon the bottom member of each truck and movable vertically with respect thereto, compression springs interposed between the blocks and bottom members, and a load bar flexibly suspended from said blocks.

7. A carrier comprising spaced supporting trucks having wheels adapted to run on an overhead trackway, each truck having a pair of opposed depending side members and a bottom member connecting said side members, a block mounted upon the bottom member of each truck and movable vertically with respect thereto, compression springs interposed between the blocks and bottom members, a pair of king-bolts, each attached at its upper end to one of said blocks and extending downwardly through an opening in the bottom member, and a load bar swiveled to the lower ends of said bolts.

8. A carrier comprising spaced supporting trucks having wheels adapted to run on on overhead trackway, each truck having a pair of opposed depending side members and a bottom member connecting said side members, a block mounted upon the bottom member of each truck and movable vertically with respect thereto, compression springs interposed between the blocks and bottom members, a pair of king-bolts, each pivotally connected at its upper end to one of said blocks and extending downwardly through an opening in the bottom member, said opening being larger than the bolt and permitting limited lateral movements thereof, and a load bar beneath the trucks and swiveled to said bolts.

9. A carrier comprising spaced supporting trucks having wheels adapted to run on an overhead trackway, each truck having a pair of opposed depending side members and a bottom member connecting said side members, a block mounted upon the bottom member of each truck and movable vertically with respect thereto, a king-bolt pivotally connected at its upper end to each block to swing about an axis extending longitudinally of the carrier, compression springs interposed between each block and the bottom member upon which it is mounted, the springs of each block being on opposite sides of the pivotal axis of the bolt, and a load bar beneath the trucks and swiveled to said bolts.

In testimony whereof, I hereunto affix my signature.

EARL T. BENNINGTON.